United States Patent
Ishii et al.

(10) Patent No.: US 7,151,948 B2
(45) Date of Patent: Dec. 19, 2006

(54) SCHEME FOR REALIZING PATH SELECTION USING OPTIMUM PATH SELECTION THRESHOLD IN RADIO COMMUNICATION

(75) Inventors: Hiroyuki Ishii, Yokosuka (JP); Takayuki Ishiguro, Yokosuka (JP); Sung Uk Moon, Yokosuka (JP); Mayu Yamada, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 480 days.

(21) Appl. No.: 10/465,612

(22) Filed: Jun. 20, 2003

(65) Prior Publication Data
US 2003/0236074 A1 Dec. 25, 2003

(30) Foreign Application Priority Data
Jun. 20, 2002 (JP) ............................. 2002-180364

(51) Int. Cl.
H04B 7/00 (2006.01)
(52) U.S. Cl. ...................... 455/522; 455/415; 455/418; 455/567; 375/148; 375/150; 375/227
(58) Field of Classification Search ................. 455/522, 455/415, 418, 567; 375/148, 150, 227
See application file for complete search history.

(56) References Cited

U.S. PATENT DOCUMENTS

| | | | |
|---|---|---|---|
| 6,151,507 A * | 11/2000 | Laiho et al. | 455/466 |
| 6,229,842 B1 * | 5/2001 | Schulist et al. | 375/148 |
| 2003/0236074 A1 * | 12/2003 | Ishii et al. | 455/69 |
| 2004/0198471 A1 * | 10/2004 | Deeds | 455/575.1 |
| 2005/0271122 A1 * | 12/2005 | Jonsson | 375/148 |

FOREIGN PATENT DOCUMENTS

CN 1309843 A 8/2001

* cited by examiner

Primary Examiner—Matthew Andereson
Assistant Examiner—Minh Dao
(74) Attorney, Agent, or Firm—Oblon, Spivak, McClelland, Maier & Neustadt, P.C.

(57) ABSTRACT

A receiver of a mobile station or a base station in radio communications is formed by a correlation unit for generating a delay profile for specifying paths by taking correlations by using replica signals for a received pilot signal, and a path selection unit for comparing a power level of each path in the delay profile with a threshold determined according to an index value regarding a communication state, selecting paths for which a comparison result satisfies a prescribed condition as valid paths, and outputting a selected delay profile formed by the valid paths as a channel estimation value.

10 Claims, 11 Drawing Sheets

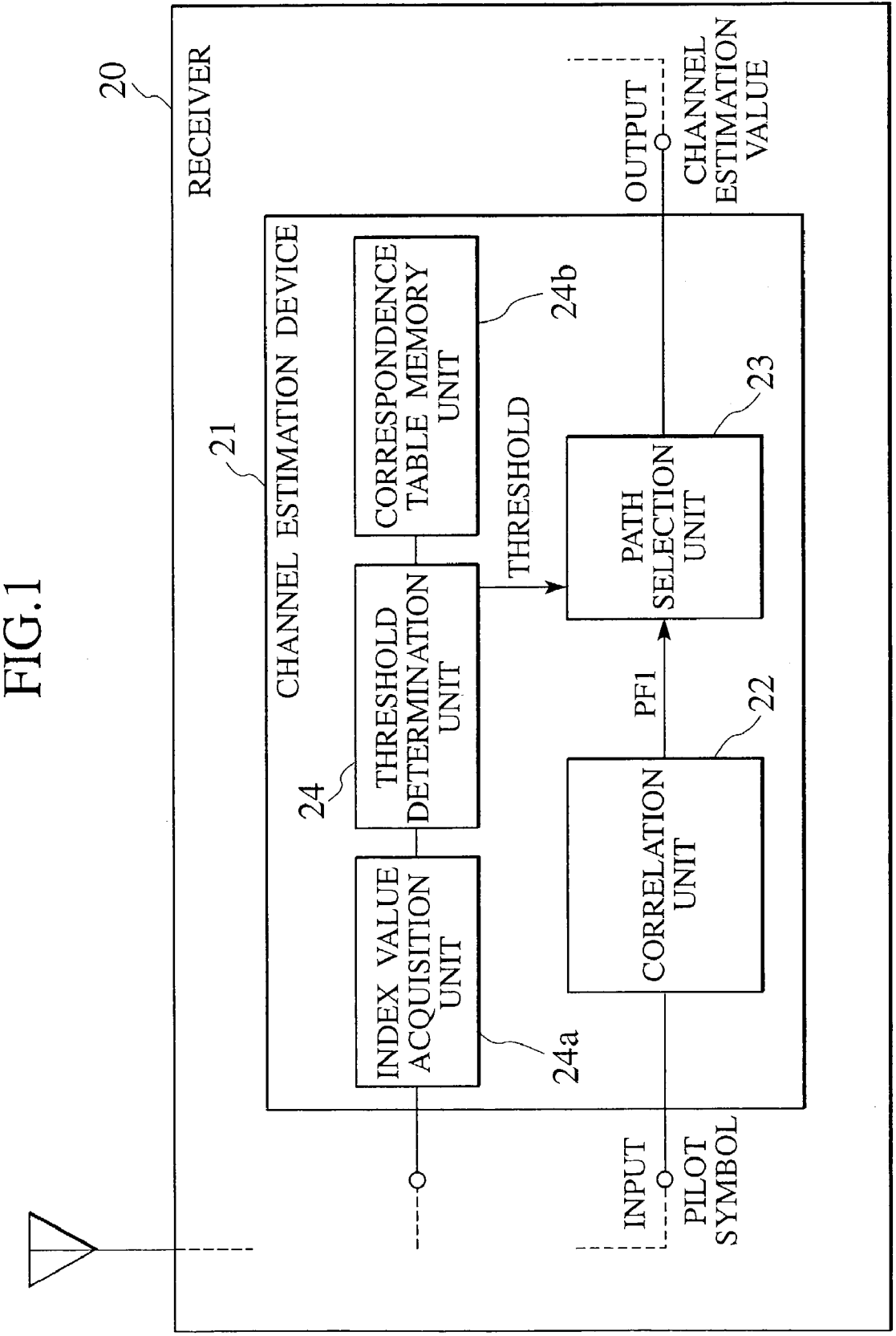

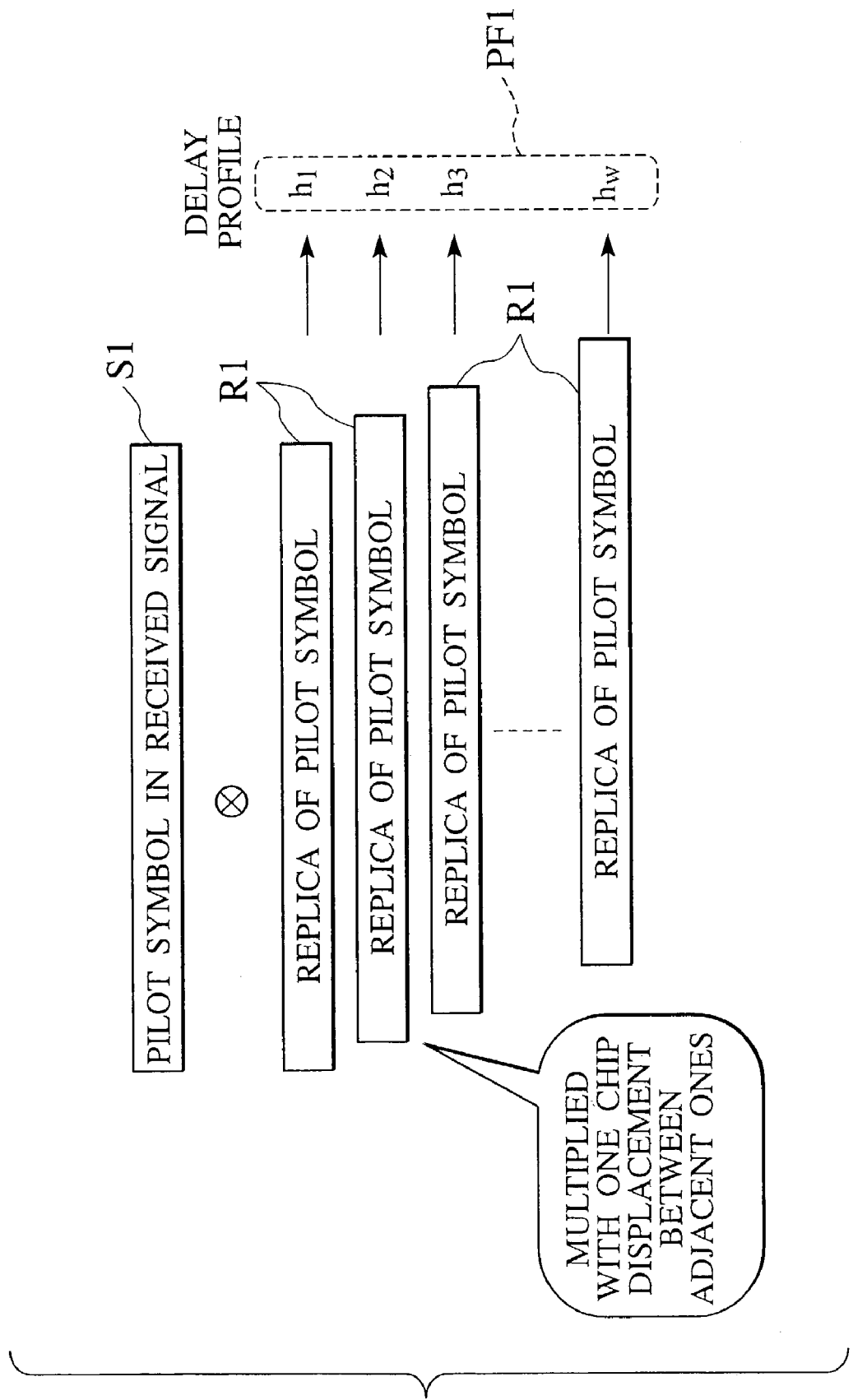

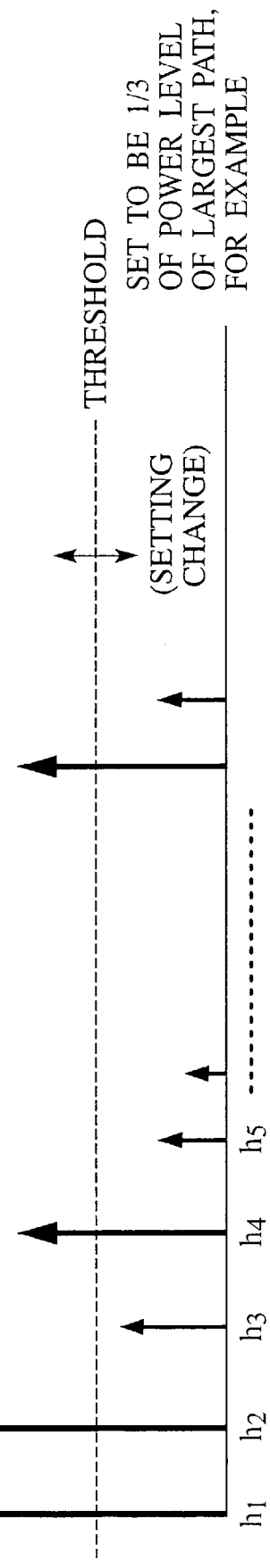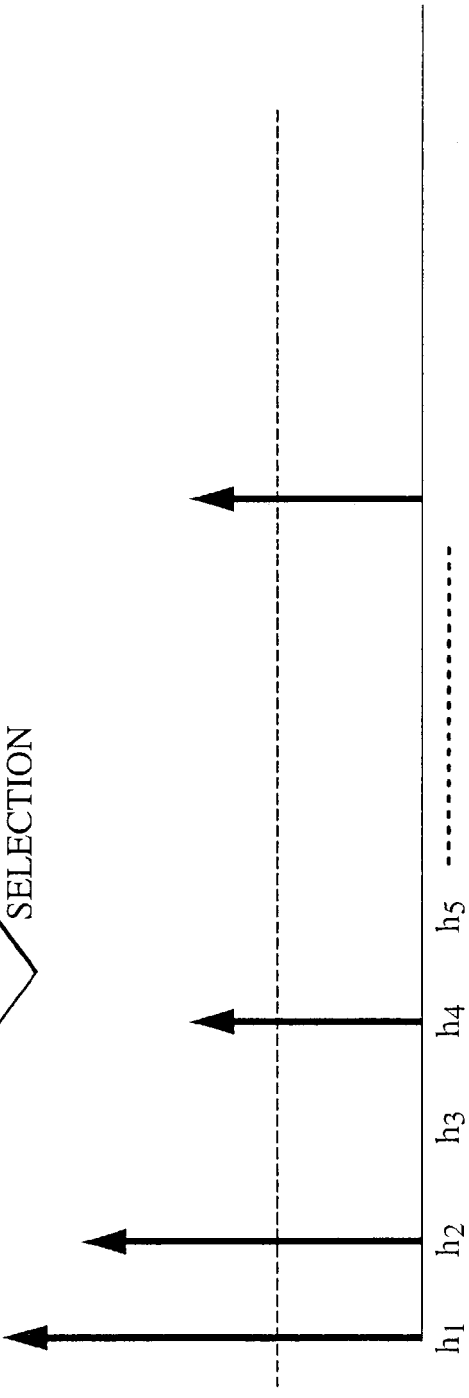

FIG.4A

| SIR VALUE | THRESHOLD |
|---|---|
| LESS THAN 5dB | 1/10 OF MAXIMUM POWER LEVEL |
| GREATER THAN 5dB | 1/12 OF MAXIMUM POWER LEVEL |

FIG.4B

| RSSI VALUE | THRESHOLD |
|---|---|
| LESS THAN 4dB | 1/10 OF AVERAGE POWER LEVEL |
| 4dB~5dB | 1/12 OF AVERAGE POWER LEVEL |
| GREATER THAN 5dB | 1/16 OF AVERAGE POWER LEVEL |

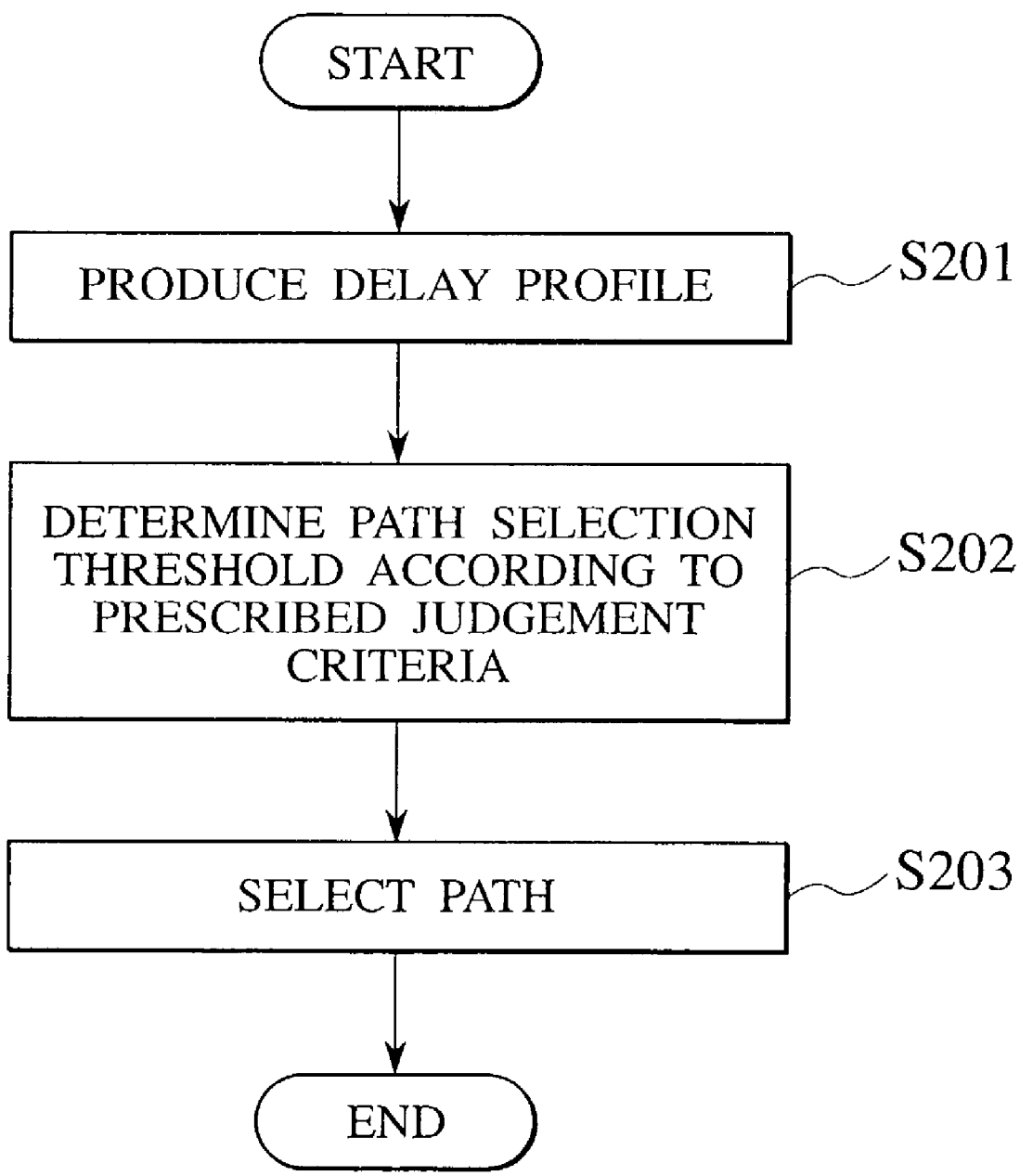

FIG.6A

| NUMBER OF USERS | THRESHOLD |
|---|---|
| GREATER | 1/12 OF MAXIMUM POWER LEVEL |
| LESS | 1/16 OF MAXIMUM POWER LEVEL |

FIG.6B

| NUMBER OF TRAFFICS | THRESHOLD |
|---|---|
| GREATER | 1/15 OF MAXIMUM POWER LEVEL |
| LESS | 1/18 OF MAXIMUM POWER LEVEL |

FIG.6C

| MCS LEVEL | THRESHOLD |
|---|---|
| 1 | 0.06 OF MAXIMUM POWER LEVEL |
| 2 | 0.05 OF MAXIMUM POWER LEVEL |
| 3 | 0.03 OF MAXIMUM POWER LEVEL |
| 4 | 0.025 OF MAXIMUM POWER LEVEL |

FIG.8A

| MODULATION METHOD | THRESHOLD |
|---|---|
| QPSK | 0.05 OF MAXIMUM POWER LEVEL |
| 16QAM | 0.02 OF MAXIMUM POWER LEVEL |

FIG.8B

| MODULATION METHOD | THRESHOLD |
|---|---|
| 64QAM | 0.06 OF AVERAGE POWER LEVEL |
| 16QAM | 0.04 OF AVERAGE POWER LEVEL |
| QPSK | 0.02 OF AVERAGE POWER LEVEL |

FIG.8C

| FADING FREQUENCY | THRESHOLD |
|---|---|
| GREATER | 1/12 OF MAXIMUM POWER LEVEL |
| LESS | 1/16 OF MAXIMUM POWER LEVEL |

FIG.8D

| LOCATION INFORMATION | THRESHOLD |
|---|---|
| INDOOR | 1/20 OF MAXIMUM POWER LEVEL |
| OUTDOOR | 1/16 OF MAXIMUM POWER LEVEL |

FIG.9A

| SERVICE TYPE | THRESHOLD |
|---|---|
| SPEECH | 1/12 OF MAXIMUM POWER LEVEL |
| DATA | 1/16 OF MAXIMUM POWER LEVEL |

FIG.9B

| TIME ZONE | THRESHOLD |
|---|---|
| NIGHT | 1/18 OF MAXIMUM POWER LEVEL |
| DAYTIME | 1/16 OF MAXIMUM POWER LEVEL |

SCHEME FOR REALIZING PATH SELECTION USING OPTIMUM PATH SELECTION THRESHOLD IN RADIO COMMUNICATION

BACKGROUND OF THE INVENTION

1. Field of the Invention

The present invention relates to mobile communications, and more particularly to a communication control system, a communication control method, a mobile station and a base station.

2. Description of the Related Art

In general, in the radio communications, signals are received through a plurality of paths and each path is affected by its own delay and fading variation, so that there is a need to carry out a channel estimation for estimating phase and amplitude variations of received signals due to the delay and the fading variation of each path, at a receiver by using a pilot symbol which is a symbol for which the transmission data modulation phase is known in advance.

FIG. 11 shows a part of a configuration of a receiver 10 for carrying out the conventional channel estimation method. Note that FIG. 11 only shows a portion of the configuration of the receiver 10 which is related to the channel estimation.

As shown in FIG. 11, the receiver 10 has a channel estimation device 11 as a device for carrying out the channel estimation, and this channel estimation device 11 has a correlation unit 12 and a path selection unit 13. The correlation unit 12 is connected to the path selection unit 13, receives an input of the pilot symbol in the received signals, produces a delay profile by using this pilot symbol, and transmits the produced delay profile to the path selection unit 13. On the other hand, the path selection unit 13 removes paths that can be regarded as noises from the elements of the delay profile transmitted from the correlation unit 12, selects valid paths, and outputs the delay profile after the path selection as a channel estimation value indicating the state of radio communication channels.

The path selection processing at this path selection unit 13 uses a method in which a reference power level is set as a threshold, a power level of each path is compared with the threshold, and a path for which the power level exceeds the threshold is selected.

However, the conventional channel estimation method fixes the threshold that becomes a reference in carrying out the path selection as described above, so that it has been impossible to carry out the path selection by using the optimum threshold at each occasion, for various radio communication channel states, various service types, various modulation schemes or various MCS (Modulation and Coding Scheme) levels.

BRIEF SUMMARY OF THE INVENTION

It is therefore an object of the present invention to provide a communication control system, a communication control method, a mobile station and a base station which are capable of carrying out path selection by using the optimum threshold according to the radio communication channel state, the service type, the modulation scheme and the MCS level of each occasion, and thereby reducing the error rate in the radio communications.

According to one aspect of the present invention there is provided a communication control system for controlling radio communications between a transmitter and a receiver, comprising: a correlation unit configured to receive a pilot signal which is a sequence known at the receiver and transmitted by the transmitter, and generate a delay profile for specifying paths by taking correlations by using replica signals for a received pilot signal; a threshold determination unit configured to determine a threshold according to an index value regarding a communication state; and a path selection unit configured to compare a power level of each path in the delay profile with the threshold, select paths for which a comparison result satisfies a prescribed condition as valid paths, and output a selected delay profile formed by the valid paths as a channel estimation value.

According to another aspect of the present invention there is provided a communication control method for controlling radio communications between a transmitter and a receiver, comprising: transmitting a pilot signal which is a sequence known at the receiver, from the transmitter; receiving the pilot signal at the receiver, and generating a delay profile for specifying paths by taking correlations by using replica signals for a received pilot signal; determining a threshold according to an index value regarding a communication state; and comparing a power level of each path in the delay profile with the threshold, selecting paths for which a comparison result satisfies a prescribed condition as valid paths, and outputting a selected delay profile formed by the valid paths as a channel estimation value.

According to another aspect of the present invention there is provided a mobile station device for carrying out radio communications with a base station, comprising: a correlation unit configured to receive a pilot signal which is a sequence known at the mobile station device and transmitted by the base station, and generate a delay profile for specifying paths by taking correlations by using replica signals for a received pilot signal; and a path selection unit configured to compare a power level of each path in the delay profile with a threshold determined according to an index value regarding a communication state, select paths for which a comparison result satisfies a prescribed condition as valid paths, and output a selected delay profile formed by the valid paths as a channel estimation value.

According to another aspect of the present invention there is provided a base station device for carrying out radio communications with a mobile station, comprising: a correlation unit configured to receive a pilot signal which is a sequence known at the base station device and transmitted by the mobile station, and generate a delay profile for specifying paths by taking correlations by using replica signals for a received pilot signal; and a path selection unit configured to compare a power level of each path in the delay profile with a threshold determined according to an index value regarding a communication state, select paths for which a comparison result satisfies a prescribed condition as valid paths, and output a selected delay profile formed by the valid paths as a channel estimation value.

Other features and advantages of the present invention will become apparent from the following description taken in conjunction with the accompanying drawings.

BRIEF DESCRIPTION OF THE DRAWINGS

FIG. 1 is a block diagram showing a schematic configuration of a receiver according to one embodiment of the present invention.

FIG. 2 is a diagram for explaining a delay profile production at a correlation unit of a receiver according to one embodiment of the present invention.

FIGS. 3A and 3B are graphs for explaining a path selection at a path selection unit of a receiver according to one embodiment of the present invention.

FIGS. 4A and 4B are diagrams showing exemplary contents of a correspondence table used by a receiver according to one embodiment of the present invention.

FIG. 5 is a flow chart showing an operation procedure for carrying out a channel estimation at a receiver according to one embodiment of the present invention.

FIGS. 6A and 6B are diagrams showing exemplary contents of a correspondence table used by a receiver according to a modified embodiment 1 of the present invention.

FIG. 6C is a diagram showing an exemplary content of a correspondence table used by a receiver according to a modified embodiment 2 of the present invention.

FIGS. 8A and 8B are diagrams showing exemplary contents of a correspondence table used by a receiver according to a modified embodiment 3 of the present invention.

FIG. 8C is a diagram showing an exemplary content of a correspondence table used by a receiver according to a modified embodiment 4 of the present invention.

FIG. 8D is a diagram showing an exemplary content of a correspondence table used by a receiver according to a modified embodiment 5 of the present invention.

FIG. 9A is a diagram showing an exemplary content of a correspondence table used by a receiver according to a modified embodiment 6 of the present invention.

FIG. 9B is a diagram showing an exemplary content of a correspondence table used by a receiver according to a modified embodiment 7 of the present invention.

DETAILED DESCRIPTION OF THE INVENTION

Figure 7:
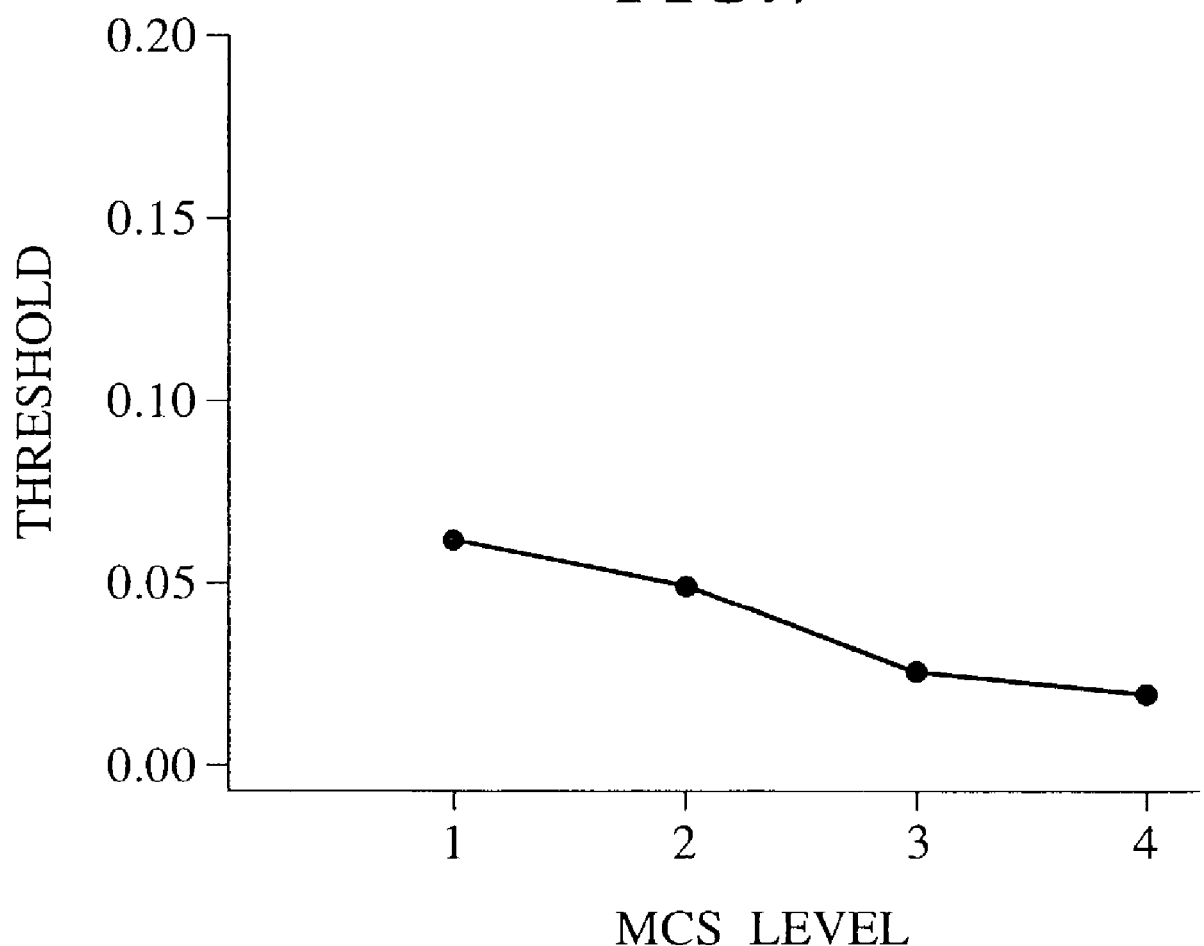
FIG. 7 is a graph showing a simulation result for obtaining optimum threshold for each MCS level according to a modified embodiment 2 of the present invention.

Referring now to FIG. 1 to FIG. 5, one embodiment of a communication control system, a communication control method, a mobile station and a base station according to the present invention will be described in detail.

(Configuration of a Receiver)

FIG. 1 shows a schematic configuration of a portion regarding the channel estimation in a receiver 20 according to this embodiment.

As shown in FIG. 1, the receiver 20 has a channel estimation device 21 as a device for carrying out the channel estimation, and this channel estimation device 21 has a correlation unit 22, a path selection unit 23 and a threshold determination unit 24.

The channel estimation device 21 carries out the channel estimation by using a pilot symbol which is a symbol for which the transmission data modulation phase is known in advance at a receiving side, and estimates the phase and amplitude variations of the received signals due to the delay and the fading variation of each path, that is, the fading complex envelop curve.

The correlation unit 22 is connected to the path selection unit 23, and has a function for detecting a position of the pilot symbol in the input received data and extracting the pilot symbol S1. Also, as shown in FIG. 2, the correlation unit 22 has a function for taking correlations by multiplying the extracted pilot symbol S1 with each one of replicas R1 of the pilot symbol stored in the correlation unit 22, i.e., symbol sequences identical to the pilot symbol which have one chip displacement between adjacent ones starting from the detected position described above, and producing the delay profile PF1. The produced delay profile PF1 is transmitted to the path selection unit 23.

The path selection unit 23 is connected to the correlation unit 22 and the threshold determination unit 24, receives a path selection threshold transmitted from the threshold determination unit 24 and the delay profile PF1 transmitted from the correlation unit 22, carries out the path selection according to a prescribed algorithm, removes background noises such as interferences and noises from signals of other communicating parties and the multi-path signals of the own channel from the delay profile PF1, and produces and outputs the delay profile formed only by valid paths, that is, the channel estimation value.

Here, the algorithm for the path selection can be any one of the algorithm in which a threshold is set according to the power level of the path with the largest power and the valid paths having the received power greater than or equal to that threshold are selected, the algorithm in which a threshold is set according to an average power level of the delay profile and the valid paths having the received power greater than or equal to that threshold are selected, and the algorithm in which a threshold is set according to the background noise power level and the valid paths having the received power greater than or equal to that threshold are selected. FIGS. 3A and 3B illustrate the principle of the algorithm in which a threshold is set according to the power level of the path with the largest power and the valid paths having the received power greater than or equal to that threshold are selected, as an example of the path selection processing.

In further detail, the threshold is set to be ⅓ of the power level of the largest path as shown in FIG. 3A, for example, and by comparing the received power of each path with this threshold, the paths h1, h2, h4, etc. that have the power level greater than or equal to the threshold among a plurality of paths h1, h2, h3, and so on are selected as shown in FIG. 3B.

The threshold determination unit 24 is connected to the path selection unit 23, determines the path selection threshold for the purpose of carrying out the path selection, according to an index value for determining the threshold, and transmits the path selection threshold to the path selection unit 23. More specifically, as shown in FIG. 1, the threshold determination unit 24 has an index value acquisition unit 24a for acquiring the index value from a base station or the like, and a correspondence table memory unit 24b for storing a correspondence table.

In further detail, the threshold determination unit 24 acquires the threshold by referring to the correspondence table stored in the correspondence table memory unit 24b according to the index value inputted from the index value acquisition unit 24a, and outputs the acquired threshold to the path selection unit 23.

In this embodiment, the index value is a radio quality index value for indicating a radio quality of the communication channel by which the communication is currently carried out, which can be any of a Signal to Interference Ratio (SIR), a Carrier to Interference Ratio (CIR), a Signal to Noise Ratio (SNR), a Carrier to Noise Ratio (CNR), a received power, and a Received Signal Strength Indication signal (RSSI), at the own station, for example.

The correspondence table in this embodiment is a table data in which the quality index value described above and the threshold are set in correspondence, which can be formed as shown in FIG. 4A, for example. Namely, the path selection threshold can be set to be 1/10 of the power level of the path having the largest power among the delay profile when the SIR value measured by the receiver 20 is less than a prescribed value, 5 dB for example, and the path selection threshold can be set to be 1/12 of the power level of the path having the largest power among the delay profile when the SIR value is greater than 5 dB.

Also, the correspondence table can be formed as shown in FIG. 4B, such that the path selection threshold can be set to be 1/10 of the average power level of the delay profile when the RSSI value measured by the receiver 20 is less than a prescribed value, 4 dB for example, the path selection threshold can be set to be 1/12 of the average power level of the delay profile when the RSSI value is greater than 4 dB and less than 5 dB, and the path selection threshold can be set to be 1/16 of the average power level of the delay profile when the RSSI value is greater than 5 dB.

Here, the relationship between the radio quality index value and the path selection threshold is not necessarily limited to a relationship according to which the path selection threshold is made smaller when the radio quality index value is larger and the path selection threshold is made larger when the radio quality index value is smaller, and can be a relationship according to which the path selection threshold is made smaller when the radio quality index value is smaller and the path selection threshold is made larger when the radio quality index value is larger.

In addition, the relationship between the radio quality index value and the path selection threshold can be set in a more detailed manner, continually according to the radio quality index value, as given by the equation:

(path selection threshold)=f(radio quality index value)

for example. Here, f(x) is arbitrary function such as a linear function, a quadratic function, etc.

Note that the receiver according to the present invention is applicable to all the receivers for carrying out the radio communications, so that it can be used as the receiver of the mobile station as well as the receiver of the radio base station, for example.

(Operation of a Receiver)

The operation of the receiver 20 having the above described configuration will now be described with reference to FIG. 5, which shows an operation procedure in the case of carrying out the channel estimation at the receiver 20.

As shown in FIG. 5, at the step S201, the correlation unit 22 detects the position of the pilot symbol S1 in the received data and extracts the pilot symbol S1, produces the delay profile by taking correlations by multiplying the extracted pilot symbol S1 with each one of replicas R1 of the pilot symbol at the receiving side, i.e., symbol sequences identical to the pilot symbol which have one chip displacement between adjacent ones starting from the detected position described above, and transmits the produced delay profile to the path selection unit 23.

Next, at the step S202, the threshold determination unit 24 determines the path selection threshold for the purpose of carrying out the path selection according to the radio quality index value which is an index value for indicating a radio quality of the communication channel by which the communication is currently carried out, and transmits the path selection threshold to the path selection unit 23.

Then, at the step S203, the path selection unit 23 receives the path selection threshold transmitted from the threshold determination unit 24 and the delay profile transmitted from the correlation unit 22, carries out the path selection according to a prescribed algorithm, removes background noises such as interferences and noises from signals of other communicating parties and the multi-path signals of the own channel from the delay profile, and produces and outputs the delay profile formed only by valid paths, that is, the channel estimation value.

(Effects of a Receiver)

In general, the transmission characteristic becomes better and the error rate in the communications becomes lower when the number of paths is greater because the path diversity effect can be obtained. However, the transmission characteristic becomes worse when the signals due to noises are erroneously judged as paths and demodulated. Consequently, according to the receiver in this embodiment, it is possible to set the path selection threshold smaller when the radio quality index value is larger, that is, when the noises or interferences are less, such that signals can be demodulated by accounting for more paths, and it is also possible to set the path selection threshold larger when the radio quality index value is smaller, that is, when the noises or interferences are greater, such that a possibility for erroneously judging signals due to noises as paths can be lowered. As a result, the receiver according to this embodiment can carry out the path selection by using the optimum threshold in the radio environment at each occasion, and thereby reduce the error rate in the communications.

The present invention is not necessarily limited to one embodiment described above. Referring now to FIG. 6A to FIG. 10, various modifications that can be made on the above described embodiment of the present invention will be described in detail.

(Modified Embodiment 1)

In the above described embodiment, the threshold determination unit 24 may determine the path selection threshold for the purpose of carrying out the path selection, according to the number of users that are carrying out communications simultaneously or the number of traffics, instead of the radio quality index value.

Here, the correspondence table memory unit 24b stores the table data in which the number of users or the number of traffics and the threshold are set in correspondence as shown in FIG. 6A or FIG. 6B, and the index value acquisition unit 24a acquires the number of users that are currently in communications or the number of traffics. Then, the threshold determination unit 24 determines the path selection threshold for the purpose of carrying out the path selection, according to the number of users that are carrying out communications simultaneously or the number of traffics.

The content of the correspondence table can be set as shown in FIG. 6A such that the path selection threshold can be set to be 1/12 of the power level of the path having the largest power among the delay profile when the number of users that are carrying out communications simultaneously is greater than a prescribed value, and the path selection threshold can be set to be 1/16 of the power level of the path having the largest power among the delay profile when the number of users that are carrying out communications simultaneously is less than the prescribed value.

Also, the content of the correspondence table can be set as shown in FIG. 6B such that the path selection threshold can be set to be 1/15 of the power level of the path having the largest power among the delay profile when the number of traffics is greater than a prescribed value, and the path selection threshold can be set to be 1/18 of the power level of the path having the largest power among the delay profile when the number of traffics is less than the prescribed value.

Here, the relationship between the number of users that are carrying out communications simultaneously or the number of traffics and the path selection threshold is not necessarily limited to a relationship according to which the path selection threshold is made larger when the number of users that are carrying out communications simultaneously or the number of traffics is larger and the path selection threshold is made smaller when the number of users that are carrying out communications simultaneously or the number of traffics is smaller, and can be a relationship according to which the path selection threshold is made smaller when the number of users that are carrying out communications simultaneously or the number of traffics is larger and the path selection threshold is made larger when the number of users that are carrying out communications simultaneously or the number of traffics is smaller.

In addition, the relationship between the number of users that are carrying out communications simultaneously or the number of traffics and the path selection threshold can be set in a more detailed manner, as given by the equation:

(path selection threshold)=f(number of users that are carrying out communications simultaneously or number of traffics)

for example. Here, f(x) is arbitrary function such as a linear function, a quadratic function, etc.

According to the receiving of this modified embodiment 1, when the number of users that are carrying out communications simultaneously or the number of traffics is larger, interferences by the other users are greater so that signals due to interferences in the delay profile are increased, and therefore a possibility for erroneously judging signals due to interferences as paths and demodulating them can be lowered by setting the path selection threshold for the purpose of carrying out the path selection larger. On the other hand, when the number of users that are carrying out communications simultaneously or the number of traffics is smaller, interferences by the other users are less so that signals due to interferences in the delay profile are decreased, and therefore the more path diversity effect can be obtained by setting the path selection threshold for the purpose of carrying out the path selection smaller, so that the error rate in the communications can be reduced.

(Modified Embodiment 2)

Also, in the above described embodiment, the threshold determination unit 24 may determine the path selection threshold for the purpose of carrying out the path selection, according to the MCS level, instead of the radio quality index value.

Here, the MCS level will be described briefly. The MCS level is a combination of adaptively varied modulation scheme and coding rate in the adaptive modulation and coding (AMC) in which the modulation scheme and the coding rate R of the turbo coding are made variable adaptively according to the moving speed of the receiver and the radio quality.

Here, the correspondence table memory unit 24b stores the table data in which the MCS level and the threshold are set in correspondence as shown in FIG. 6C, and the index value acquisition unit 24a acquires the MCS level. Then, the threshold determination unit 24 determines the path selection threshold for the purpose of carrying out the path selection, according to the MCS level.

For example, consider the case of carrying out the AMC by using four MCS levels including MCS level 1 (QPSK, R=½), MCS level 2 (QPSK, R=¾), MCS level 3 (16QAM, R=½), and MCS level 4 (16QAM, R=¾). When the simulation was actually carried out for this case to obtain the optimum threshold at each MCS level, the result as shown in FIG. 7 was obtained.

Consequently, the path selection threshold is set to be 0.06 of the power level of the path having the largest power among the delay profile when the communications are carried out by using the MCS level 1, the path selection threshold is set to be 0.05 of the power level of the path having the largest power among the delay profile when the communications are carried out by using the MCS level 2, the path selection threshold is set to be 0.03 of the power level of the path having the largest power among the delay profile when the communications are carried out by using the MCS level 3, and the path selection threshold is set to be 0.025 of the power level of the path having the largest power among the delay profile when the communications are carried out by using the MCS level 4, for example.

According to the receiver of this modified embodiment 2, the path selection can be carried out by using the optimum path selection threshold whenever the MCS level is switched, so that the error rate in the communications can be reduced.

(Modified Embodiment 3)

Also, in the above described embodiment, the threshold determination unit 24 may determine the path selection threshold for the purpose of carrying out the path selection, according to a type of the modulation scheme by which communications are carried out, instead of the radio quality index value.

Here, the correspondence table memory unit 24b stores the table data in which the modulation scheme and the threshold are set in correspondence as shown in FIG. 8A or FIG. 8B, and the index value acquisition unit 24a acquires the modulation scheme. Then, the threshold determination unit 24 determines the path selection threshold for the purpose of carrying out the path selection, according to the modulation scheme by which communications are carried out.

For example, the path selection threshold can be set to be 0.05 of the power level of the path having the largest power among the delay profile when the communications are carried out by using the QPSK, and the path selection threshold can be set to be 0.02 of the power level of the path having the largest power among the delay profile when the communications are carried out by using the 16QAM.

Also, for example, the path selection threshold can be set to be 0.06 of the average power level of the delay profile when the communications are carried out by using the 64QAM, the path selection threshold can be set to be 0.04 of the average power level of the delay profile when the communications are carried out by using the 16QAM, and the path selection threshold can be set to be 0.02 of the average power level of the delay profile when the communications are carried out by using the QPSK.

According to the receiver of this modified embodiment 3, the path selection can be carried out by using the path selection threshold suitable for the modulation scheme by which communications are carried out, so that the error rate in the communications can be reduced.

(Modified Embodiment 4)

Also, in the above described embodiment, the threshold determination unit 24 may determine the path selection threshold for the purpose of carrying out the path selection, according to a fading pitch (fading frequency) for the communication channel on the path, instead of the radio quality index value.

Here, the correspondence table memory unit 24b stores the table data in which the fading frequency and the threshold are set in correspondence as shown in FIG. 8C, and the index value acquisition unit 24a acquires the fading frequency during communications. Then, the threshold determination unit 24 determines the path selection threshold for the purpose of carrying out the path selection, according to the fading frequency.

For example, the path selection threshold can be set to be $\frac{1}{12}$ of the power level of the path having the largest power among the delay profile when the fading frequency is greater than a prescribed value, and the path selection threshold can be set to be $\frac{1}{16}$ of the power level of the path having the largest power among the delay profile when the fading frequency is less than the prescribed value.

Here, the relationship between the fading frequency and the path selection threshold is not necessarily limited to a relationship according to which the path selection threshold is made larger when the fading frequency is larger and the path selection threshold is made smaller when the fading frequency is smaller, and can be a relationship according to which the path selection threshold is made smaller when the fading frequency is larger and the path selection threshold is made larger when the fading frequency is smaller.

In addition, the relationship between the fading frequency and the path selection threshold can be set in a more detailed manner, as given by the equation:

(path selection threshold)=f(fading frequency)

for example. Here, f(x) is arbitrary function such as a linear function, a quadratic function, etc.

According to the receiver of this modified embodiment 4, the path selection can be carried out by using the path selection threshold suitable for the fading encountered by the radio communication channel at each occasion, so that the error rate in the communications can be reduced.

(Modified Embodiment 5)

Also, in the above described embodiment, the threshold determination unit 24 may determine the path selection threshold for the purpose of carrying out the path selection, according to a location information of the mobile station, instead of the radio quality index value.

Here, the correspondence table memory unit 24b stores the table data in which the location information and the threshold are set in correspondence as shown in FIG. 8D, and the index value acquisition unit 24a acquires the location information. Then, the threshold determination unit 24 determines the path selection threshold for the purpose of carrying out the path selection, according to the location information.

Here, the location information of the mobile station can be a location information in various senses ranging from a specific location information on coordinates indicated by using GPS or the like, to a broad location information indicating it is located in one cell or sector, it is located indoor, it is located outdoor, etc. Also, this modified embodiment based on the location information of the mobile station is applicable to the receivers of both the mobile station and the radio base station, For example, the path selection threshold can be set to be $\frac{1}{20}$ of the power level of the path having the largest power among the delay profile when the mobile station is located indoor, and the path selection threshold can be set to be $\frac{1}{16}$ of the power level of the path having the largest power among the delay profile when the mobile station is located outdoor. Also, the path selection threshold can be set to be a value specific to a prescribed area when the mobile station is located in the prescribed area (such as a particular sector or cell, inside of a particular building, inside of a particular site).

In addition, the relationship between the location information (the location information according to GPS, for example) and the path selection threshold can be set in a more detailed manner, as given by the equation:

(path selection threshold)=f(location information of mobile station)

for example. Here, f(x) is arbitrary function such as a linear function, a quadratic function, etc.

According to the receiver of this modified embodiment 5, the path selection can be carried out by using the path selection threshold suitable for the location information of the mobile station, so that the error rate in the communications can be reduced.

(Modified Embodiment 6)

Also, in the above described embodiment, the threshold determination unit 24 may determine the path selection threshold for the purpose of carrying out the path selection, according to a service type, instead of the radio quality index value.

Here, the correspondence table memory unit 24b stores the table data in which the service type and the threshold are set in correspondence as shown in FIG. 9A, and the index value acquisition unit 24a acquires the service type of currently carried out communications. Then, the threshold determination unit 24 determines the path selection threshold for the purpose of carrying out the path selection, according to the service type.

For example, the path selection threshold can be set to be $\frac{1}{12}$ of the power level of the path having the largest power among the delay profile when the communications for the speech communication service are carried out, and the path selection threshold can be set to be $\frac{1}{16}$ of the power level of the path having the largest power among the delay profile when the communications for the data communication service are carried out.

According to the receiver of this modified embodiment 6, the path selection can be carried out by using the path selection threshold suitable for the service type, so that the error rate in the communications can be reduced.

(Modified Embodiment 7)

Also, in the above described embodiment, the threshold determination unit 24 may determine the path selection threshold for the purpose of carrying out the path selection, according to a time zone for carrying out communications, instead of the radio quality index value.

Here, the correspondence table memory unit 24b stores the table data in which the time zone and the threshold are set in correspondence as shown in FIG. 9B, and the index value acquisition unit 24a acquires the time zone of currently carried out communications. Then, the threshold determination unit 24 determines the path selection threshold for the purpose of carrying out the path selection, according to the time zone for carrying out communications.

For example, the path selection threshold can be set to be $\frac{1}{18}$ of the power level of the path having the largest power among the delay profile when the communications are carried out in the night time zone, and the path selection threshold can be set to be $\frac{1}{16}$ of the power level of the path having the largest power among the delay profile when the communications are carried out in the daytime time zone.

According to the receiver of this modified embodiment 7, the path selection can be carried out by using the path selection threshold suitable for the time zone for carrying out communications, so that the error rate in the communications can be reduced.

(Modified Embodiment 8)

Figure 10:
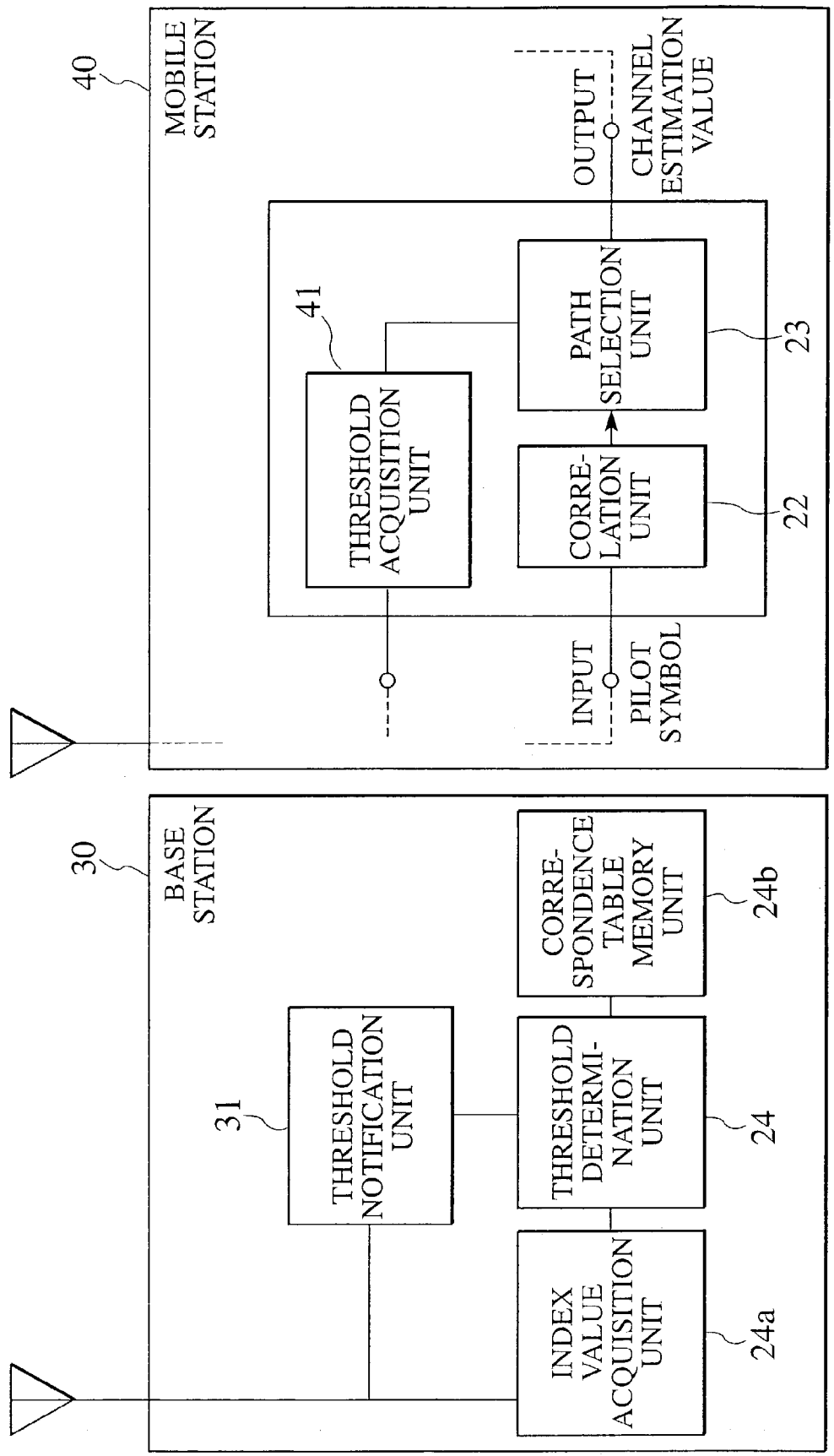
FIG. 10 is a block diagram showing a schematic configuration of a communication control system according to a modified embodiment 8 of the present invention.
Figure 11:
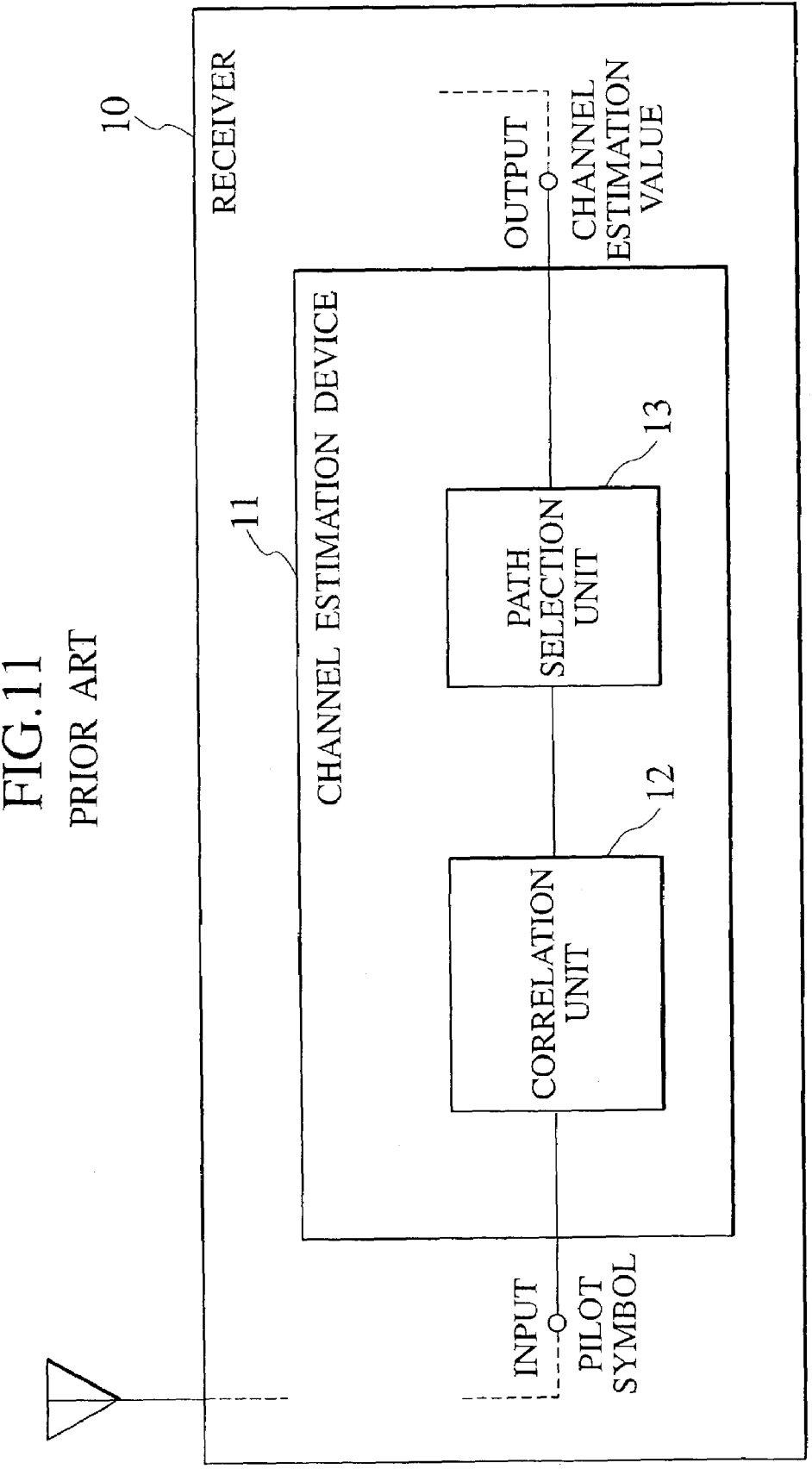
FIG. 11 is a block diagram showing a schematic configuration of a conventional receiver.

In the above described embodiment and modified embodiments, the exemplary case of providing the index value acquisition unit 24a, the threshold determination unit 24 and the correspondence table memory unit 24b at the receiver which is assumed to be a mobile station, but the present invention is not necessarily limited to this case, and as shown in FIG. 10, the index value acquisition unit 24a, the threshold determination unit 24 and the correspondence table memory unit 24b can be provided at a base station 30.

In this case, the base station (transmitter) 30 refers to the correspondence table memory unit 24b according to the index value, extracts the threshold, and notifies this extracted threshold from a threshold notification unit 31 to a threshold acquisition unit 41 of a mobile station (receiver) 40. The threshold acquisition unit 41 outputs the acquired threshold to the path selection unit 23, and the path selection unit 23 outputs the channel estimation value by the procedure described above.

As described, according to the communication control system, the communication control method, the mobile station and the base station according to the present invention, the receiver changes the path selection threshold according to one of the measured radio quality, the service type, the modulation scheme, the MCS level, the number of users that are carrying out communications, the number of traffics, the time zone, the location information of the mobile station, the fading frequency, etc., such that the path selection can be carried out by using the path selection threshold optimum in the radio environment of each occasion, and thereby the error rate in the communications can be reduced.

Note that, in the present invention, the radio communications between the transmitter and the receiver may include communications between a base station and a mobile station, communications between base stations, and communications between mobile stations, and which one of the transmitter and the receiver is to be used at a given station depends on whether this station is a transmitting side or a receiving side of the communications, regardless of whether this station is a mobile station or a base station.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A communication control system for controlling radio communications between a transmitter and a receiver, comprising:
a correlation unit configured to receive a pilot signal which is a sequence known at the receiver and transmitted by the transmitter, and generate a delay profile for specifying paths by taking correlations by using replica signals for a received pilot signal;
a threshold determination unit configured to determine a threshold according to an index value regarding a communication state; and
a path selection unit configured to compare a power level of each path in the delay profile with the threshold, select paths for which a comparison result satisfies a prescribed condition as valid paths, and output a selected delay profile formed by the valid paths as a channel estimation value;
wherein the index value indicates one of a number of users communicating simultaneously, a number of traffics, a MCS (Modulation and Coding Scheme) level, a modulation scheme by which communications are currently carried out, and a fading frequency, the threshold being determined according to said one of the number of users communicating simultaneously, the number of traffics, the MCS level, the modulation scheme by which communications are currently carried out, and the fading frequency.

2. A communication control method for controlling radio communications between a transmitter and a receiver, comprising:
transmitting a pilot signal which is a sequence known at the receiver, from the transmitter;
receiving the pilot signal at the receiver, and generating a delay profile for specifying paths by taking correlations by using replica signals for a received pilot signal;
determining a threshold according to an index value regarding a communication state; and
comparing a power level of each path in the delay profile with the threshold, selecting paths for which a comparison result satisfies a prescribed condition as valid paths, and outputting a selected delay profile formed by the valid paths as a channel estimation value;
wherein the index value indicates one of a number of users communicating simultaneously, a number of traffics, a MCS (Modulation and Coding Scheme) level, a modulation scheme by which communications are currently carried out, and a fading frequency, the threshold being determined according to said one of the number of users communicating simultaneously, the number of traffics, the MCS level, the modulation scheme by which communications are currently carried out, and the fading frequency.

3. A mobile station device for carrying out radio communications with a base station, comprising:
a correlation unit configured to receive a pilot signal which is a sequence known at the mobile station device and transmitted by the base station, and generate a delay profile for specifying paths by taking correlations by using replica signals for a received pilot signal; and
a path selection unit configured to compare a power level of each path in the delay profile with a threshold determined according to an index value regarding a communication state, select paths for which a comparison result satisfies a prescribed condition as valid paths, and output a selected delay profile formed by the valid paths as a channel estimation value;
wherein the index value indicates one of a number of users communicating simultaneously, a number of traffics, a MCS (Modulation and Coding Scheme) level, a modulation scheme by which communications are currently carried out, and a fading frequency, the threshold being determined according to said one of the number of users communicating simultaneously, the number of traffics, the MCS level, the modulation scheme by which communications are currently carried out, and the fading frequency.

4. The mobile station device of claim 3, further comprising:

a threshold determination unit configured to acquire the index value, and determine the threshold according to an acquired index value.

5. The module station device of claim 3, wherein the path selection unit has a function for acquiring the threshold determined at the base station according to the index value.

6. A base station device for carrying out radio communications with a mobile station, comprising:
a correlation unit configured to receive a pilot signal which is a sequence known at the base station device and transmitted by the mobile station, and generate a delay profile for specifying paths by taking correlations by using replica signals for a received pilot signal; and
a path selection unit configured to compare a power level of each path in the delay profile with a threshold determined according to an index value regarding a communication state, select paths for which a comparison result satisfies a prescribed condition as valid paths, and output a selected delay profile formed by the valid paths as a channel estimation value;
wherein the index value indicates one of a number of users communicating simultaneously, a number of traffics, a MCS (Modulation and Coding Scheme) level, a modulation scheme by which communications are currently carried out, and a fading frequency, the threshold being determined according to said one of the number of users communicating simultaneously, the number of traffics, the MCS level, the modulation scheme by which communications are currently carried out, and the fading frequency.

7. The base station device of claim 6, further comprising:
a threshold determination unit configured to acquire the index value, and determine the threshold according to an acquired index value.

8. The mobile station device of claim 6, wherein the path selection unit has a function for acquiring the threshold determined at the mobile station according to the index value.

9. A base station device for carrying out radio communications with a mobile station, comprising:
a transmission unit configured to transmit a pilot signal which is a sequence known at the mobile station, to the mobile station, such that the mobile station generates a delay profile for specifying paths by taking correlations by using replica signals for the pilot signal received from the base station device, which is to be used in a path selection by the mobile station to select paths which satisfy a prescribed condition as valid paths;
a threshold determination unit configured to acquire an index value regarding a communication state, and determine a threshold to be compared with a power level of each path in the delay profile by the path selection at the mobile station, according to an acquired index value; and
a threshold notification unit configured to notify the threshold determined by the threshold determination unit to the mobile station;
where in the index value indicates one of a number of users communicating simultaneously, a number of traffics, a MCS (Modulation and Coding Scheme) level, a modulation scheme by which communications are currently carried out, and a fading frequency, the threshold being determined according to said one of the number of users communicating simultaneously, the number of traffics, the MCS level, the modulation scheme by which communications are currently carried out, and the fading frequency.

10. A base station device for carrying out radio communications with a mobile station, comprising:
a transmission unit configured to transmit a pilot signal which is a sequence known at the mobile station, to the mobile station, such that the mobile station generates a delay profile for specifying paths by taking correlations by using replica signals for the pilot signal received from the base station device, which is to be used in a path selection by the mobile station to select paths which satisfy a prescribed condition as valid paths; and
an index value notification unit configured to acquire an index value regarding a communication state, which is to be used in determining a threshold to be compared with a power level of each path in the delay profile by the path selection at the mobile station, and notify an acquired index value to the mobile station;
wherein the index value indicates one of a number of users communicating simultaneously, a number of traffics, a MCS (Modulation and Coding Scheme) level, a modulation scheme by which communications are currently carried out, and a fading frequency, the threshold being determined according to said one of the number of users communicating simultaneously, the number of traffics, the MCS level, the modulation scheme by which communications are currently carried out, and the fading frequency.

* * * * *